(12) United States Patent
Petrovic

(10) Patent No.: US 11,527,759 B2
(45) Date of Patent: Dec. 13, 2022

(54) DUAL POROSITY CATHODE FOR LITHIUM-AIR BATTERY

(71) Applicant: Slobodan Petrovic, Portland, OR (US)

(72) Inventor: Slobodan Petrovic, Portland, OR (US)

( * ) Notice: Subject to any disclaimer, the term of this patent is extended or adjusted under 35 U.S.C. 154(b) by 0 days.

(21) Appl. No.: 17/751,541

(22) Filed: May 23, 2022

(65) Prior Publication Data

US 2022/0293962 A1 Sep. 15, 2022

Related U.S. Application Data

(63) Continuation-in-part of application No. 17/734,104, filed on May 1, 2022, which is a continuation of application No. 16/812,291, filed on Mar. 7, 2020, now Pat. No. 11,322,749.

(51) Int. Cl.
| | |
|---|---|
| *H01M 4/66* | (2006.01) |
| *H01M 4/137* | (2010.01) |
| *H01M 4/60* | (2006.01) |
| *H01M 10/052* | (2010.01) |
| *H01M 4/62* | (2006.01) |
| *H01M 4/02* | (2006.01) |

(52) U.S. Cl.
CPC ........... *H01M 4/663* (2013.01); *H01M 4/137* (2013.01); *H01M 4/602* (2013.01); *H01M 4/628* (2013.01); *H01M 4/668* (2013.01); *H01M 10/052* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2014/0099539 A1* | 4/2014 | Yamazaki | H01M 4/366 423/325 |
| 2016/0190446 A1* | 6/2016 | Schulze | H01L 29/1606 438/478 |

\* cited by examiner

*Primary Examiner* — Ula C Ruddock
*Assistant Examiner* — Tony S Chuo
(74) *Attorney, Agent, or Firm* — Stephen Joncus

(57) ABSTRACT

A dual porosity cathode for a lithium-air battery made from porous nanographene sponge molded to form a multitude of pores embedded in a polymer layer. The first level of porosity is the interior surface area of the molded pores. The second level of porosity is the interior surface area within the micropores within the porous nanographene sponge material. The dual porosity cathode is useful for a lithium-air battery because of the greatly increased cathode surface area created by the micropores and the very small localized quantities of $LiO_2$ that form in the micropores from the reaction between $Li^+$ and oxygen.

6 Claims, 15 Drawing Sheets

DUAL POROSITY CATHODE FOR LITHIUM-AIR BATTERY

This continuation in part application claims priority to application Ser. No. 17/734,104 filed May 1, 2022, which is a continuation that claims priority to application Ser. No. 16/812,291 filed Mar 7, 2020, which issued as U.S. Pat. No. 11,322,749 on May 3, 2022.

BACKGROUND

Batteries generate electrical energy from a chemical reaction. Many different types of batteries have been designed for different applications and different needs. Batteries made of different materials have distinct performance characteristics in terms of energy density (watt-hours/kg), power density (watts/kg), cycle life, safety, and cost.

A battery is a device having one or more electrochemical cells. The positive terminal of a battery is the cathode. The negative terminal, the anode, is the source of the electrons during discharge flow through an external circuit powering the device connected to the battery. During discharge of a battery, a redox reaction generates electrons that are supplied to a circuit as electrical energy.

Batteries are ubiquitous. The world-wide market is larger than $100 billion per year and growing at approximately 8% per year. Lithium batteries are the focus of intense research because lithium is the lightest of all metals (the density of lithium metal density is only about half that of water) and has the most negative electrochemical potential (−3.05 V). Lithium batteries have other desirable characteristics. They typically discharge at a relatively constant voltage with little variation. Lithium batteries have a relatively long shelf-life with a low rate of self-discharge. Lithium batteries also have high Coulombic efficiency—most of a charge can be discharged to supply electric power.

The basic theory of a lithium battery involves the oxidation of lithium on the anode—the negative electrode. During discharge of the battery, a lithium atom gives up an electron to the circuit and the resulting $Li^+$ ion transports through the electrolyte to the cathode. The cathode is typically a layered or honeycombed structure that permits the $Li^+$ ions to fill into the spaces, or intercalate, in the crystalline structure of the cathode material. During charging of the battery, electrons are supplied to the negative terminal from a power supply or charger, in the case of lithium metal batteries, they react with Li+ ions to form lithium metal.

There are two basic version of lithium batteries: lithium metal and lithium-ion. Lithium metal and lithium-ion are distinguished based on the nature of the anode active material. Due to safety issues with lithium metal batteries, the most well-known and used form is the lithium-ion battery with liquid electrolyte.

Lithium batteries were first developed in the 1970's and commercialized in the 1980's. The first lithium batteries had an anode made of lithium metal and a cathode made of molybdenum sulfide. Lithium metal has a theoretically higher energy content, but the build-up or plating of lithium on the anode during charging creates sharp projections called dendrites. These dendrites can grow and have the mechanical strength to puncture through the separator between the anode and cathode, causing a short circuit, heat generation, and potential fire.

These problems with the first lithium metal batteries caused them to be replaced by lithium-ion batteries. Lithium-ion batteries are the most commonly used type of lithium batteries today. In the case of lithium-ion, the anode contains a structure that provides mechanical support that enables bonding of lithium in a charged state. Lithium-ion batteries are designed to prevent the creation of lithium metal which reduces the probability of formation of lithium dendrites. While several materials can be used as negative electrodes in lithium-ion batteries, the most important material is graphite. Graphite has a layered structure that permits lithium-ion insertion in the matrix of carbon and bondging with carbon. During discharge, lithium gives up an electron, detaches from the graphite, and travels as a lithium-ion (Li+) through the electrolyte to the cathode. Once reaching the cathode, the lithium-ion intercalates between the layers of the cathode material and forms a bond with the cathode material.

There is demand for continuous improvement in battery technology. In current lithium-ion batteries, certain cathode material chemistries provide relatively high specific energy and energy density. Yet the capabilities of modern electronic devices are still limited by the available battery capacity. While more energy can be obtained from lithium metal, lithium-ion batteries predominate because of the historical safety problems with lithium metal batteries.

Traditional lithium-ion batteries use an electrode design that have not improved much in decades. The anode is constructed using an electrode support, usually graphite, and with other additives; and pressing it or rolling it onto the thin metal sheet. While there are many different anode supports, most are based on some form of carbon, soft carbon, hard carbon, the most popular being graphite.

The basic properties of the anode for a lithium-ion battery limit battery performance. Furthermore, the method of construction often leads to mechanical problems. The presence of graphite is also suspected to lead to issues with performance such as growth of a solid-electrolyte interphase layer with components of electrolyte decomposition. This layer over time slows down the reaction and contributes to loss of capacity after cycling.

As a result of numerous problems with current manufacturing methods for lithium-ion batteries, there is a great need for innovation that would enable better performance, higher specific energy and energy density, and higher cycle life. The disclosed design provides a battery structure that safely utilizes the higher energy potential of lithium metal without the historical risk of uncontrolled reaction and fire.

Besides lithium, other metals such as sodium, magnesium or aluminum can be used as anodes in batteries. The metal closest to performance of lithium in batteries is sodium. The overall energy in case of sodium is lower compared with lithium because of a less negative electrochemical potential, however, sodium is more readily available in nature than lithium and is more easily processed.

SUMMARY

I have discovered a new lithium metal battery for storing electrical energy. The battery employs a plethora of small pores formed in a non-conductive polymer base material for both the cathode and anode. The internal pores walls are coated with a tapered metal layer that can be, in one embodiment, thicker deeper in the pore to form a tapered or conical metalized pore. The pores in the flexible polymer substrate create easily accessible sites for active electrode battery materials, for example, lithium (or sodium) metal on the anode, and a variety of possible cathode chemistries such as $LiCoO_2$, $LiMn_2O_4$, $FeSO_4$, $NiO_2$, and others. The active masses react, that is, they are oxidized or reduced in isolated reaction zones in the metalized pores of the polymer material. Because the pores are small and physically separated from each other forming closed sub-systems, the reduction and oxidation of lithium metal occurs in small reaction zones and prevents problems, previously experienced, with lithium metal batteries such as those caused by: reactions that are too slow or have poor performance; reactions that are too fast, uncontrolled reaction that could lead to thermal runaway; or the formation of lithium metal dendrites that can create short circuits.

The form factor of this new lithium metal battery is very thin, but a current collector having a high surface area, making it suitable for many potential applications that require high power density, such as certain electrical vehicles, power tools, and because of flexibility the wearable devices.

DESCRIPTION

Figure 1A:
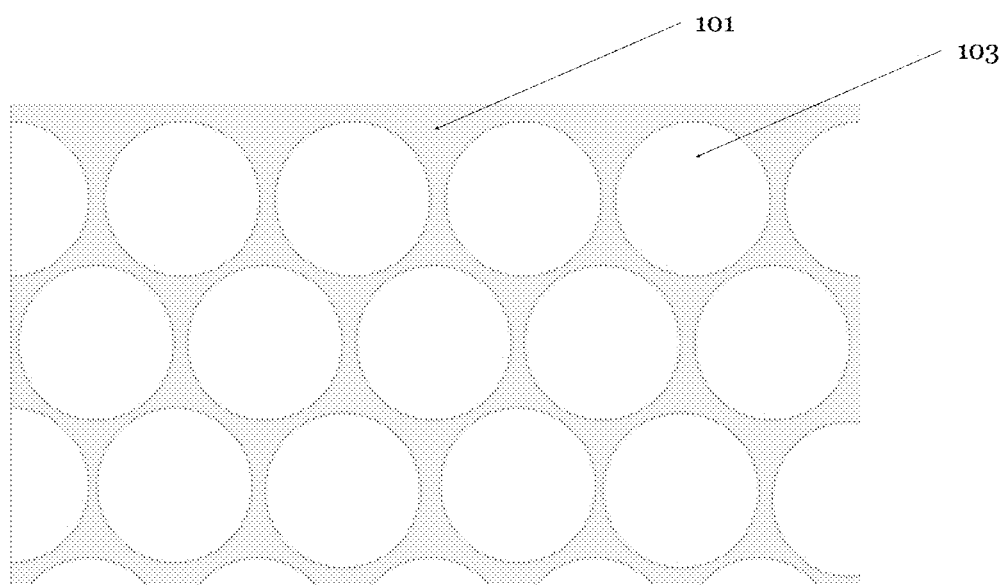
FIG. 1A is a plan view of a polymer sheet base material with pores.
Figure 1B:
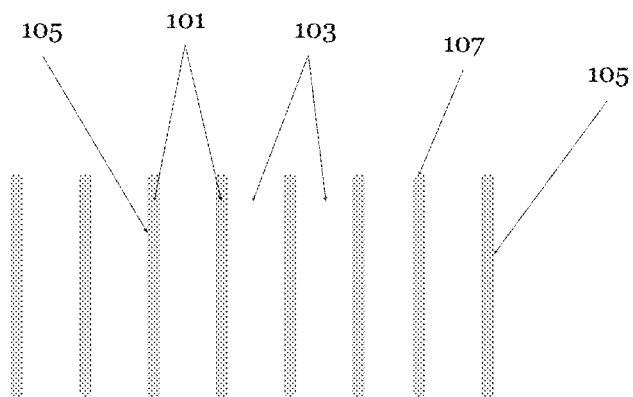
FIG. 1B is a cross section of a polymer sheet base material with pores.

The assembly of the new battery begins with thin porous polymer sheets 101 as the base material for both the cathode and the anode as shown in FIG. 1A and FIG. 1B. The thin polymer sheet may be made of, polyethylene, polypropylene, polytetrafluorethylene, polyvinyldene fluoride, polyethersulfone, or other similar materials. Each of these materials can be made into a porous form, with pores 103 arranged in a structured manner which means pores that are relatively uniformly distributed and have relatively consistent pore dimensions such as diameter and pitch. The pores can be formed in the polymer material using different methods, such as stretching thin films or by laser cutting. Ideally, the diameter for the pores 103 for the anode are about 20 microns with an edge between the pores that is 1 to 3 microns, creating a pitch of approximately 22 microns, but the pores 103 are not restricted to these dimensions. The pores 103 take up most of the area of the polymer sheet 101. The total volume of the pores in the porous polymer sheet 101 destined to be made in the cathode 401 often needs to be larger than the volume of the pores in the porous polymer sheet 101 destined to be made into the anode 301. Ideally, the thickness of the thin polymer sheet 101 for the anode and the cathode may each be 70-80 microns but is not restricted to this range. The design for the thickness of the polymer sheet 101 and the diameter of the pores 103 can be adjusted as needed for the intended use of the battery. If higher energy is desired, then a thicker polymer sheet 101 may be utilized; if designing for greater power, a thinner polymer sheet 101 may be utilized. The pores 103 are cylindrical, or another column-like shape, with walls 105. The edge 107 between the pores is minimized to be a much smaller surface area than the total surface of the pore walls 105 and to maximize the volume available for the active mass while retaining mechanical stability.

Figure 1C:
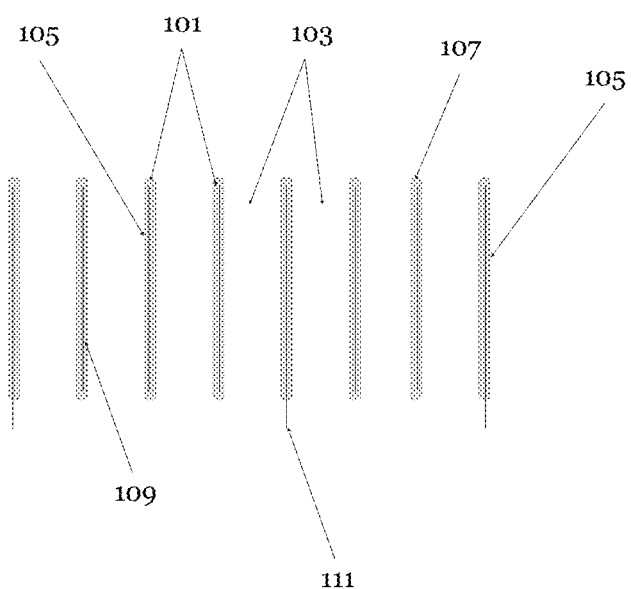
FIG. 1C is a cross section of another embodiment of a polymer sheet base material with pores.

Another way of forming a flexible and porous polymer sheet 101 is to use a wire mesh 109 of an appropriate size to form pores 103 of the same dimensions identified above, i.e., ideally 20 microns in diameter and 70-80 microns deep. Such a metal reinforced polymer has multiple benefits, including that it generates very structured pores, enhances mechanical stability while maintaining flexibility. The wire mesh is coated with a high-dielectric polymer such a Paralyne to create the polymer base material, as shown in FIG. 1C which can be metalized to form an anode 301 and cathode 401 as further described below. The wire mesh 109 is encased in the Paralyne except in strategic locations there are electrode leads 111 for connection to the external circuit.

The relative size of the pores for the anode 301 and the cathode 401 will depend on the specification for the particular energy content of the cell or battery which will determine how much lithium needs to be available in the cathode active mass 403 to meet the performance requirements for the cell or battery. For some cathode chemistries, the volume needed to contain the cathode active mass 403 in the cathode 401 will be larger than needed to contain the lithium that plates out as lithium metal in the pores 103 for the anode 301.

Figure 2A:
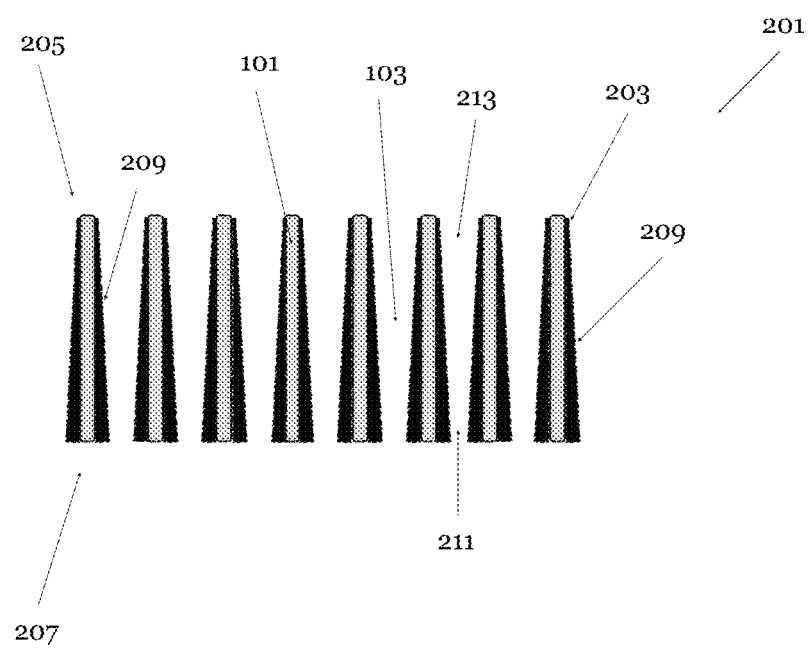
FIG. 2A is a cross section of a polymer sheet base material with metal deposited in the pores.

An electrode 201 that will form the basis for assembly of both of the anode and cathode, is created by first depositing a metal layer 203 throughout the porous polymer structure 101 and particularly coating the pore walls 105 as shown in FIG. 2A. Each electrode 201 has an opposing electrode facing surface 205 and a backside 207. Metal deposition can be accomplished using a number of different methods such as electroless metal deposition, chemical vapor deposition, atomic layer deposition and other known methods to those experienced in the art. The deposition process is tuned to create a tapered deposition in the shape of a funnel 209 on the walls of the pores 105 such that the thickest layer of metal material in the pores 103 is at the base of each pore 211 proximate to the backside 207. The thinnest part of the funnel 209 is at the top of each pore 213 proximate to the opposing electrode facing surface 205. Depositing metal in the form of a funnel 209 in the pores 103 encourages the lithium to travel deep into the pores 103 to the base of the pore 211 before being reduced and plating out as lithium metal. The thicker the metal deposition at a location, the lower the electrical resistance. Lithium-ions are more attracted to locations with thicker metal deposition due to the lower electrical resistance. Tapering the metal deposition in a pore therefore encourages the lithium-ions to travel deeper into the funnel 209 and deeper into the pore 103 before oxidizing and forming lithium metal during charging.

The tapered metal funnel 209 is also desirable for the electrode 201 that will be used to form the cathode 401 to similarly encourage the lithium-ions to travel deep into the cathode active mass 403. The amount of taper of the tapered metal funnel 209 may range from no taper at all (where the diameter of the opening at the top of each pore 213 is the same as the diameter of the opening at the bottom of the pore 211) to completely closing off the pore at the base of the pore 211 as shown in FIG. 2C. Depending on the design objectives of the cell, the taper may be such that after metalization the area of the opening at the base of the pore 211 may be specified to be about 80%, 64%, 49%, 36%, 25%, 16%, 9%, 4%, or 1% of the area of the opening at the top of the pore 213.

In the case of a wire reinforced polymer sheet 101 as shown in FIG. 1C, the deposited metal for the tapered metal funnel 209 will come in contact with the electrode leads 111 which facilitates superior conductivity between the metalized pores and the external circuit which is a significant advantage of using a metal reinforced polymer sheet 101 as the base material.

Figure 2B:
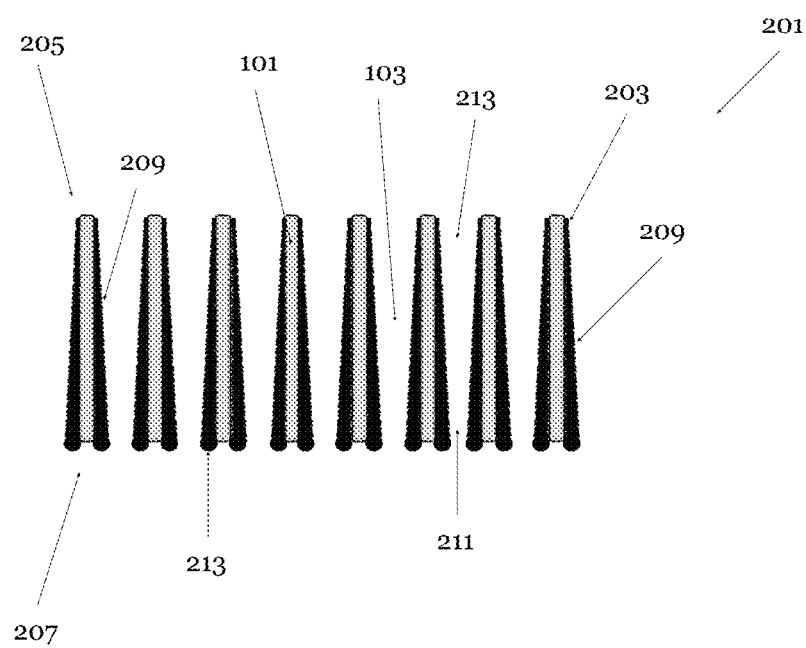
FIG. 2B is another embodiment of a cross section of a polymer sheet base material with metal deposited in the pores.
Figure 2C:
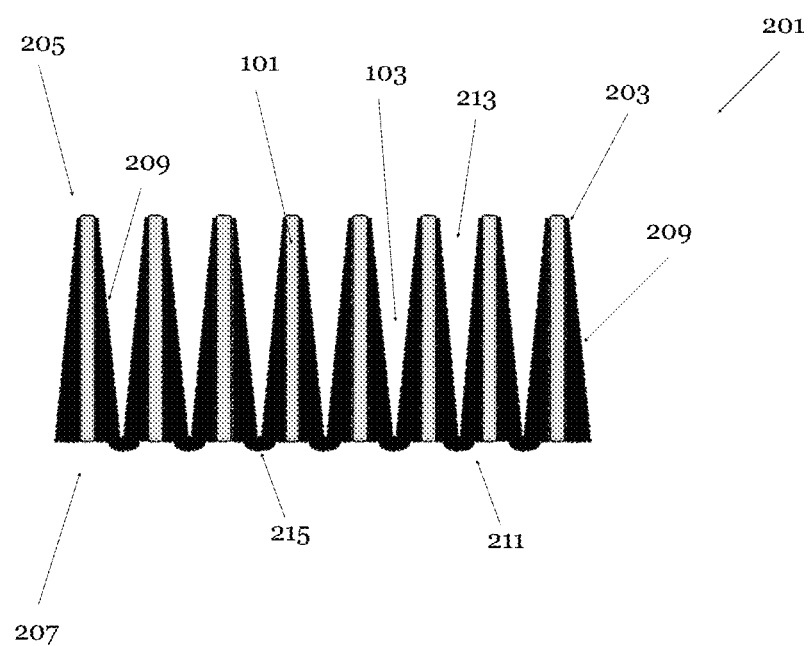
FIG. 2C is another embodiment of a cross section of a polymer sheet base material with metal deposited in the pores.

Optionally, the metal deposition can include a lip 213 at the base of the pore 211 as shown in FIG. 2B to improve the electrical connection between the electrode and the external circuit. If the metal deposition is tapered to the extent that it completely closes off the opening at the base of the pore 211, it is desirable to create a metal mushroom 215 as shown in FIG. 2C that protrudes from the backside 207 at each pore 103 to improve the electrical connection between the electrode and the circuit.

Ideally, if using atomic layer deposition, metal is not deposited on the opposing electrode facing surface 205. It is not needed or desirable to apply metal to the opposing electrode facing surface 205. But not all metal deposition processes can be tuned to avoid depositing metal on the opposing electrode facing surface 205. To the extent that metal is deposited on the opposing electrode facing surface 205, it is desirable to use a form of electrical insulation applied to electrically isolate the anode from the cathode and to prevent short circuits.

The metal layer 203 can be composed of a single metal or of multiple layers of different metals. For example, a first metal can be applied for good adhesion to polymer, followed by an intermediate metal and the final metal on which the reactions will occur. The metal layers 203 do not need to be perfectly uniform and pinholes in metal layer would not have significant negative effect on the performance. The metal layers may be nickel, copper, titanium, gold, silver, but also other conductive layers such as carbides or nitrides. After metalization, an electrode 201 that forms the basis of the anode and cathode is completed.

Figure 3:
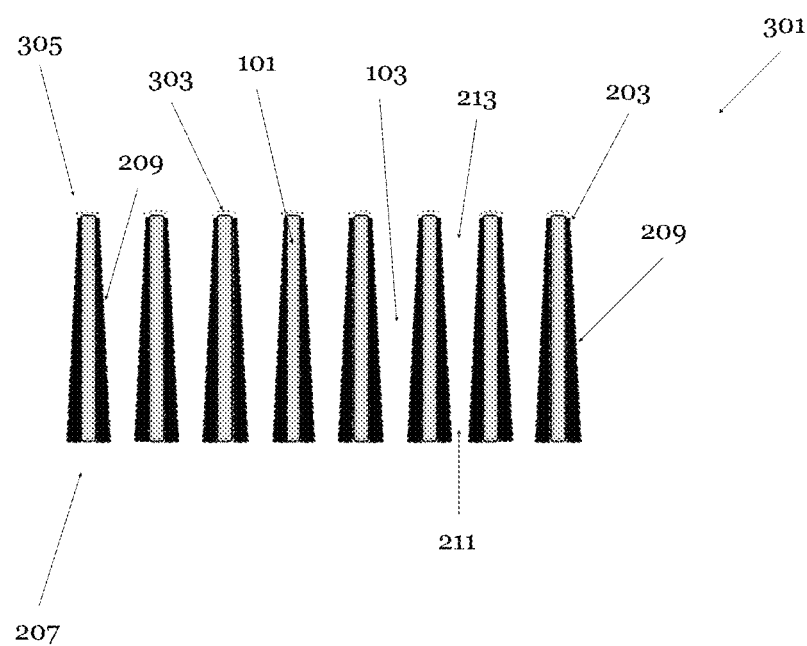
FIG. 3 is a cross section of an anode.

To form an anode 301 from the electrode 201 the cathode facing surface 305 of the anode 301 is passivated by applying a non-conductive material 303 as shown in FIG. 3. This step may be optional if metal was not deposited on the cathode facing surface 305 during the metal deposition process. The passivation of the cathode facing surface 305 with a non-conductive material 303 prevents lithium reduction on the cathode facing surface 305 and forces the lithium to travel into the pores 103 before being reduced and plating out as lithium metal. By passivating the cathode facing surface 305 between the pores 103, lithium plating can only occur inside the pores 103 and on the tapered metal funnel 209 on the pore walls 105. As described above, the shape of the metal funnel 209 in the pores (and correspondingly the conductivity of the metal surface at various depths in the pores) can be tailored through the deposition process so that lithium plating can be encouraged to occur first at the base of the pores 211. When the initial lithium plating takes place at the base of the pores 211, the pores 103 fill from the base 211 up, with lithium metal plating on the tapered metal funnel 209 filling the pores 103 from the bottom to the top.

Figure 4:
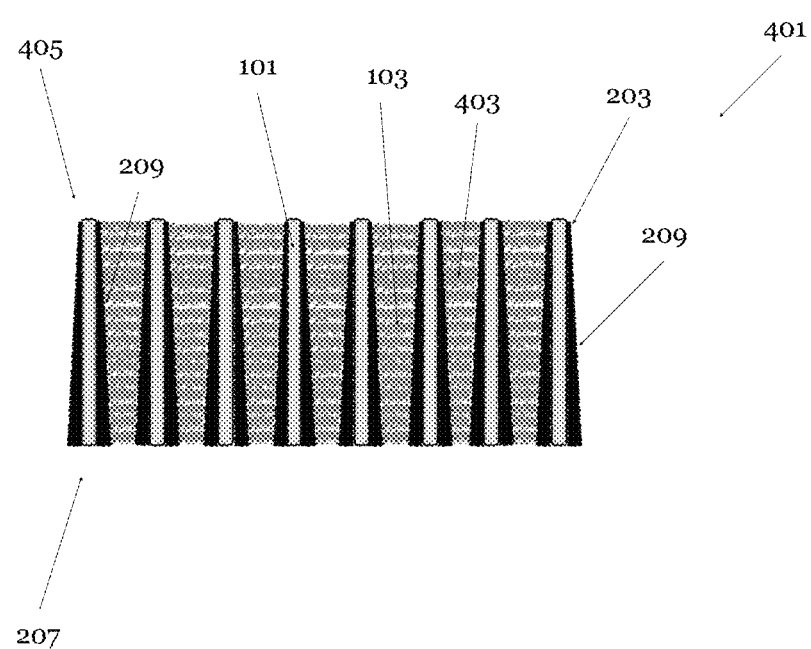
FIG. 4 is a cross section of a cathode.

Passivation can be accomplished with different treatments using non-conductive polymers such as selective polymer deposition. Some polymers, such as Paralyne (and in particular Paralyne C and Paralyne F), can be deposited with room temperature vacuum deposition only on the cathode facing surface 305 and slightly (20-30 microns) into the mouth of the pores. With passivation of the cathode facing surface 305 and the funnel shaped metal deposition 209 inside the pores 103, the reduction and formation of lithium metal is directed towards the base of the pores 211. After the passivation, the electrode 301 shown in FIG. 3 is a completed anode. The electrode 201 is also the basis for creating a cathode 401 as shown in FIG. 4.

For the cathode 401, passivation of the anode facing surface 405 with a non-conductive material 303 is optional. It is preferred that the anode facing surface 405 is not passivated. To form the cathode 401, a cathode active mass 403 is deposited to fill the pores 103 having the tapered metal surface 209. The cathode active mass 403 can be inserted in the pores 103 of the cathode 401, by a number of methods: flow-deposition, hydrothermal method, atomic layer deposition, spray pyrolysis, conformed electrodeposition, pulsed laser deposition, or by in-situ synthesis of cathode active mass 403. The preferred method is in-situ synthesis of the cathode active mass 403 by suspending the cathode 401 in a solution during the synthesis of the cathode active mass. As the cathode active mass material precipitates from the solution, it fills the pores 103 to form the cathode active mass 403. To the extent that the cathode active mass material precipitates on the anode facing surface 405 or the backside 207, it will wash off when the cathode 401 is removed from the solution. The cathode active mass 403 can be made from known cathode active mass materials for lithium batteries including, but not limited to: lithium cobalt oxide (LCO), lithium manganese oxide (LMO), lithium iron phosphate (LFP), lithium aluminum oxide, lithium nickel manganese cobalt oxide (NMC), and lithium nickel cobalt aluminum oxide (NCA) and lithium sulfur. Optionally, a conductivity enhancer consisting of metal powder can be added to the solution during the in-situ synthesis so that it becomes part of the precipitated cathode active mass 403. A conductivity enhancer may also be added during other methods of depositing the cathode active mass 403 in the pores 103.

Figure 5:
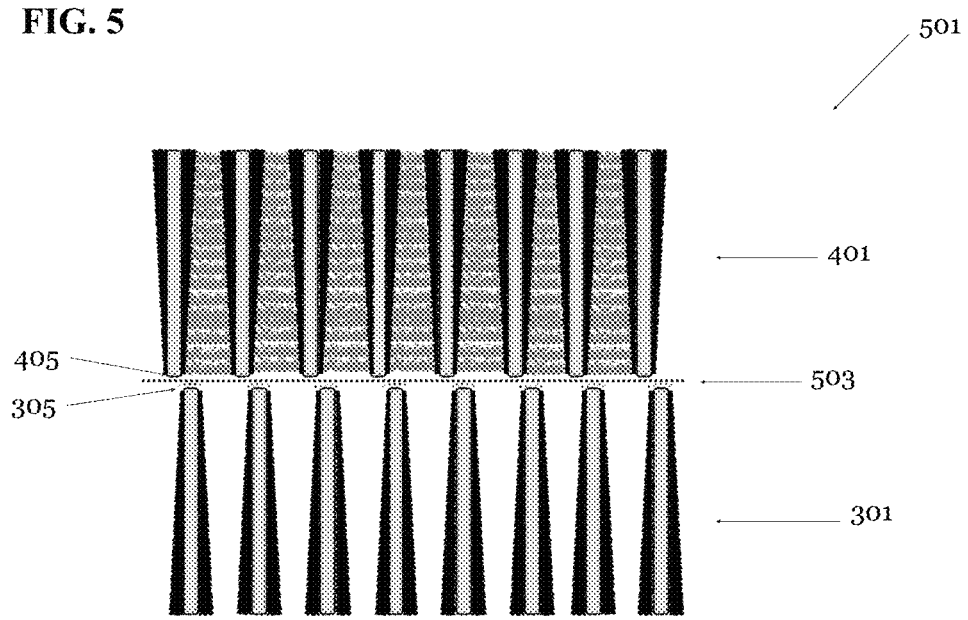
FIG. 5 is a cross section of a battery cell.

A cell assembly 501 is formed by layering the cathode 301 and the anode 401 together with the anode facing surface 405 of the cathode 401 facing the cathode facing surface 305 of the anode 301 facing each other as shown in FIG. 5. The passivated surface 303 of the anode provides sufficient separation of the positive and negative electrodes that a separator is not needed. Alternatively, if there was no metal deposition on the cathode facing surface of the anode 305, then no separator may be needed. Optionally, for extra safety, a sheet 503 can be placed between the anode 301 and the cathode 401. The sheet 503 may be a conventional separator that allows lithium-ions to pass through but is electrically insulating. A conventional separator is a dielectric porous material that prevents electrical contact between the anode and the cathode, while allowing free permeation of electrolyte and transfer of lithium-ions. A typical porosity of a conventional separator is between 30% and 60% and is 20-30 microns thick. The separator is also a polymer and some of the polymers known by those skilled in the art are the same materials as the polymers used for polymer sheet 101 used for the electrodes, such as polypropylene and polyethylene. Most commonly, the separator is made of polyolefin. Alternatively, and optionally, the sheet 503 can be a thin layer of solid electrolyte, that again allows the lithium-ions to pass through but is electrically insulating. The solid electrolyte may be selected from the following types or families of electrolyte products including, but not limited to: sodium super ionic conductor (NASICON), garnet $Li_7La_3Zr_2O_{12}$ (LLZO), crystalline perovskite type lithium lanthanum titanate ($Li_{0.5}La_{0.5}TiO_3$) (LLTO), lithium super ionic conductor ($Li_{2+2x}Zn_{1-x}GeO_4$) (LISICON), LiPON $Li_2PO_2N$, $Li_3N$, derivatives of lanthanum zirconium oxide (e.g., $Li_7La_3Zr_2O_{12}$) or lithium thiophosphates doped with halides (e.g., $Li_6PS_5Cl$ or $Li_{10}GeP_2S_{12}$), argyrodite, and antiperovskite. Another possibility is to use polymer electrolytes, that come in three types, salt-in-polymer, single-ion or charge-transfer complex. Examples of polymer electrolytes are poly(ethylene oxide) poly(vinylidene fluoride). However, the choice of polymer electrolyte that can be used is not limited to these examples.

The electrical connections between the anode 301 and cathode 401 and the external electrical circuit are made in the same manner as conventional lithium-ion cells. A liquid electrolyte is also added in the same manner as conventional cells. The cell assembly 501 is placed in a pouch, air is evacuated, and liquid electrolyte is inserted to soak the cell assembly 501. The liquid electrolyte can be chosen from the standard liquid electrolytes used in lithium-ion batteries.

Alternatively, a solid electrolyte can be used instead of liquid electrolyte. These are commonly the inorganic or polymer materials described above. The lithium ionic conductivity of the inorganic solid electrolyte materials ranges from 10-4 mS/cm up to 10-2 mS/cm at room temperature. Hybrid, liquid-solid electrolyte configuration, where the solid electrolyte is facing the anode and liquid is facing the cathode are also suitable for use with the disclosed battery. It is also possible to have a small quantity of liquid electrolyte facing the anode. The purpose of the solid electrolyte in lithium batteries is to prevent growth of lithium dendrites and ensure safety of the battery.

The active material on the anode can be lithium metal, lithium-ion, sodium metal, sodium ion, lithium silicate, lithium titanate, zinc, magnesium, potassium, calcium, or aluminum. The cathode active materials can be cobalt oxide, nickel oxide, aluminum oxide, mixed oxides (e.g. nickel, cobalt, and aluminum), iron phosphate, sulfur, and oxygen.

There are some recent anode materials that involve silicate or LiSi alloys and $TiO_2$ mixed with lithium. These materials can also be used with the disclosed battery design as anode active masses in addition to lithium metal. The porous polymer lithium battery structure will provide improved environment for these anode chemistries as well. For example, the most serious problem with silicon anode (LiSi) is extraordinary expansion and contraction during cycling, as lithium goes in and out of the anode. These large variations of volume over time create mechanical instability and lead to loss in cycle life. By using the porous polymer lithium battery structure, the reaction takes place inside the pores, which restrict the expansion and retain the shape and volume during contraction, providing thereby mechanical stability to the electrode and longer cycle life.

Multicell batteries, with the cells wired either in parallel or series can be created using conventional methods used for lithium-ion batteries. Alternatively, a bi-polar electrodes can be used, whereby the same polymer layer is metalized on both sides, with metalization allowed to continuously cover the pores and as a result establish electrical connection between two faces of the polymer film. One side of polymer coated with metal serves as anode and the other side is coated with the cathode active mass and serves as cathode. The cells are therefore connected in series to increase the system voltage. The bi-polar design, which is a very common design feature in electrochemical systems, provides for lower weight and volume of a battery. The final structure can be bent or rolled if necessary for assembly in a desired shape or to fit into a cylindrical cell such as conventional Li-ion battery cells 18650 or 21700, where the first two digits give the diameter and last three the length of a cylinder in mm.

An alternative to using metals to create electrodes are non-metallic conductive materials such as carbon nanotubes and graphene, a monolayer of carbon atoms, or borophene a monolayer material of boron atoms. Furthermore, graphene and borophene layers can be deposited not only as smooth layers, but also in form of a porous graphene or borophene sponge. A porous graphene sponge, for example, adds secondary porosity to the electrode, the first being the structure of the polymer layer and second being the pores of a graphene sponge layer. This dual porosity electrode is characterized by the additional increase in the surface area of the current collector and related increase in the number of active sites for the reaction. The pores in the graphene sponge are more than one order of magnitude smaller than the pores in the polymer structure constituting a dual porosity electrode.

The secondary porosity in the graphene sponge can be tuned to different pore sizes depending on the size of the active material. Furthermore, a particular battery type of interest is using oxygen from air on the cathode. Air is the active mass in that case and no other active mass exists in the cathode, only the electrode and the current collector. The pores of the graphene sponge can be varied by a process of mixing raw carbon source material with a polymer and performing extrusion and then removing the polymer. More polymer means larger pores, less polymer in the mixture results in smaller pores in the graphene sponge.

In one embodiment, a reverse mold fabrication is used to form the structure. First a mold 601 is formed out of etchable material such as silicon. Like the rubber teeth on a dog brush, the mold 601 has cylindrical protrusions 603 arising from a base 605 with voids 607 between the protrusions 603. The protrusions 603 are on the order of 20 microns wide, but can vary from 10 microns up to 100 microns based on the specific design characteristics of the battery. The mold 601 is formed using chemical etching of a solid block of silicon to remove the material leaving a series of protrusions 603 arising from a base 605 with voids 607 between the protrusions 603. The mold 601 has a surface 609.

Figure 6A:
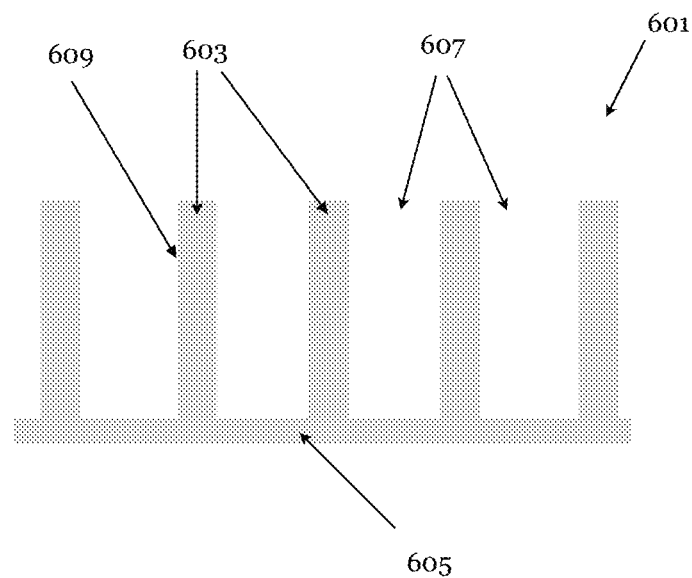
FIG. 6A depicts a mold for forming dual porosity nanographene sponge electrode.
Figure 6B:
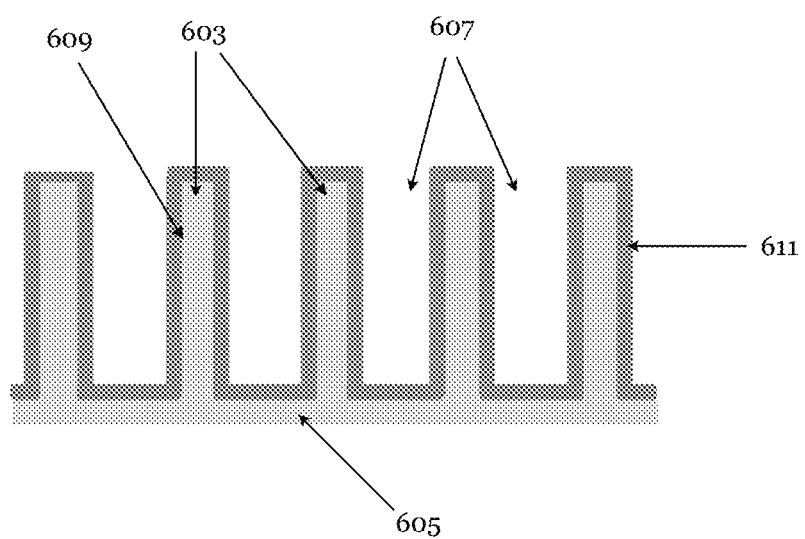
FIG. 6B shows a mold coated with nanographene sponge.
Figure 6C:
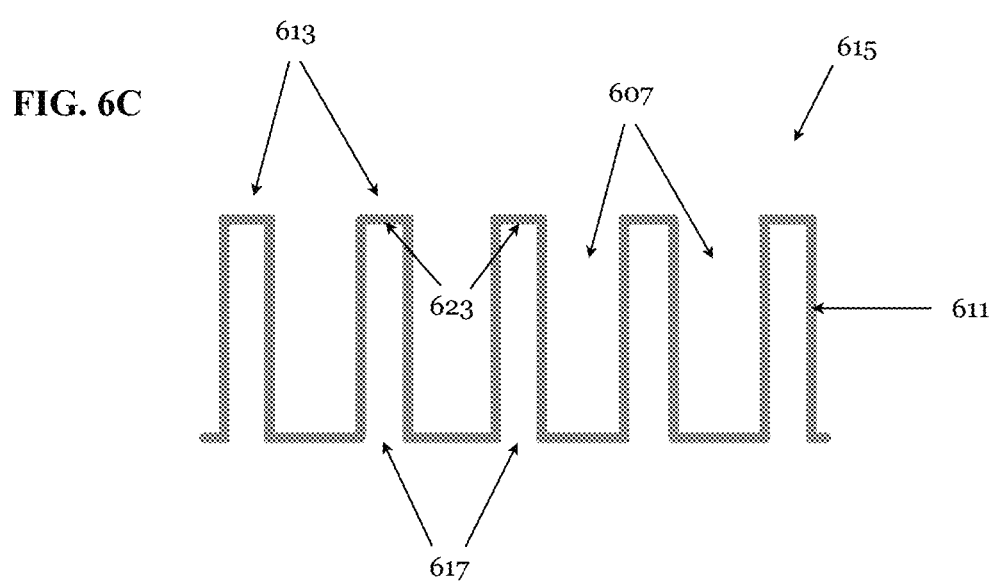
FIG. 6C shows the dual-porosity graphene sponge electrode after the mold is removed.
Figure 6D:
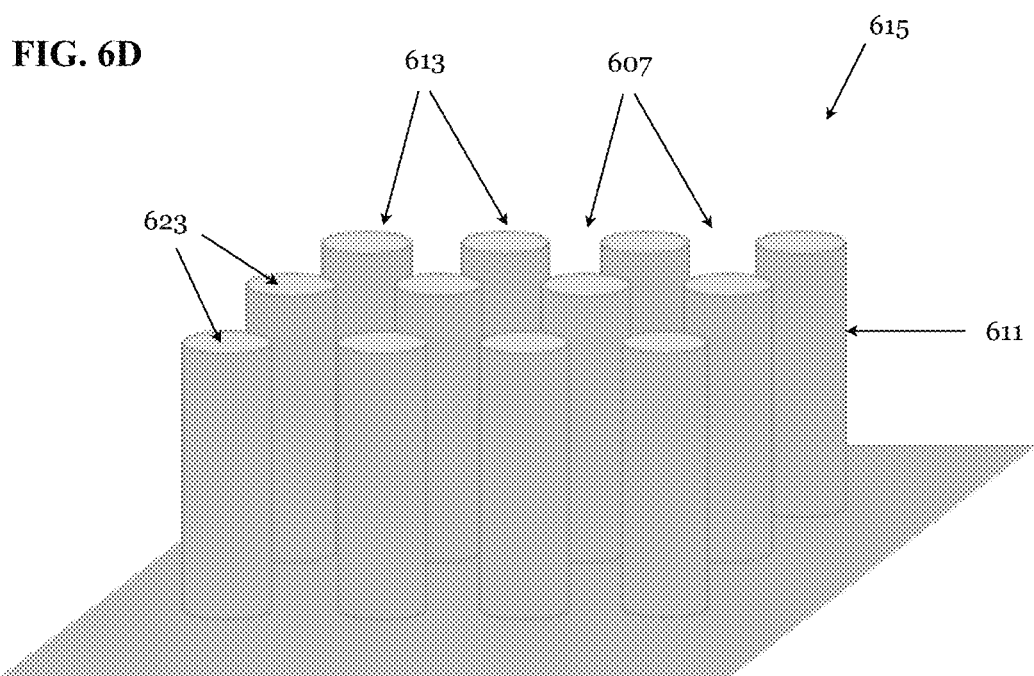
FIG. 6D shows a perspective view of the dual-porosity graphene sponge electrode after the mold is removed.
Figure 6E:
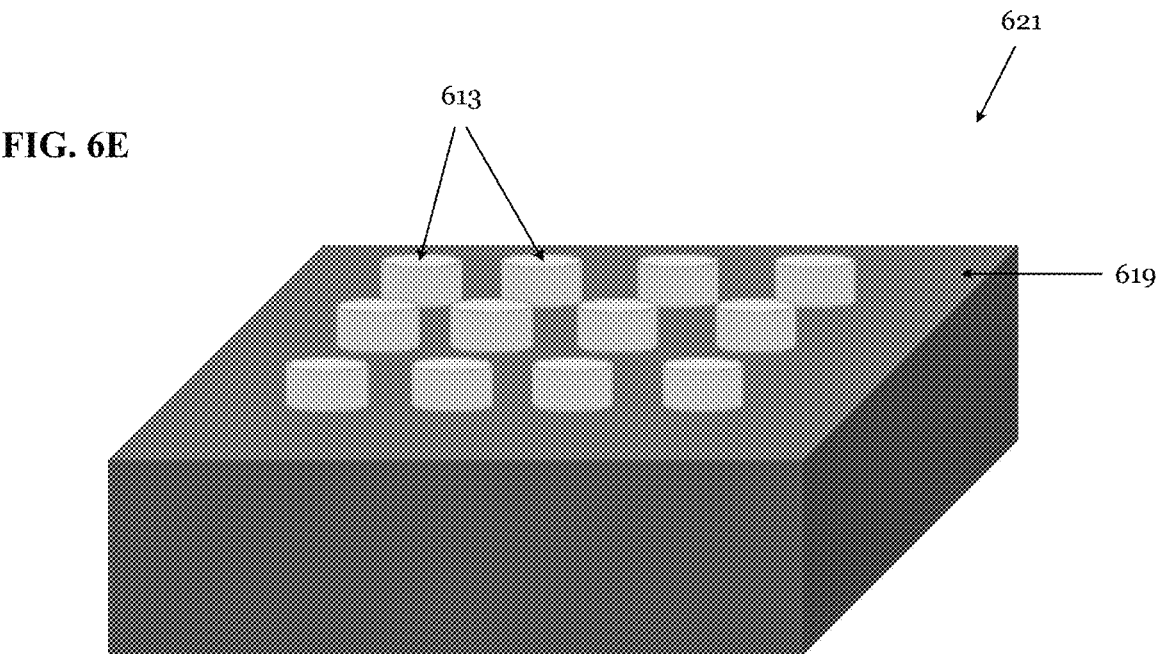
FIG. 6E shows a perspective view of a completed dual-porosity graphene sponge electrode.
Figure 6F:
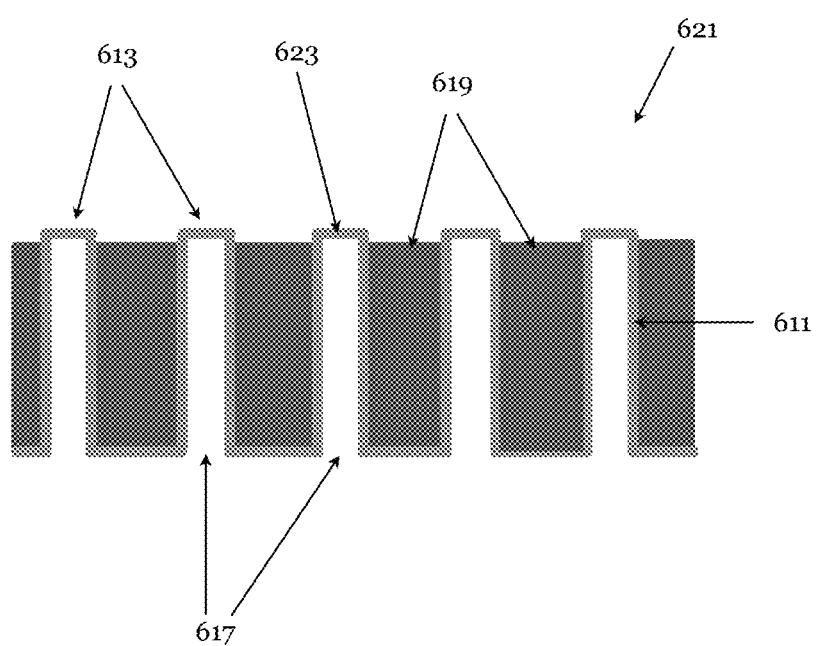
FIG. 6F show a cross section of a completed dual-porosity graphene sponge electrode.

The surface 609 is coated with nanographene sponge 611 through the method of exfoliation at temperatures above the melting point of polymers. The thickness of the nanographene sponge 611 can range from nanometers to microns depending on the design characteristic of the intended battery. The mold 601, including the protrusions 603 are dissolved and removed through chemical etching leaving behind a shell 615 of nanographene sponge 611 having hollow fingers 613 with voids 607 between the hollow fingers 613. The interior of the hollow fingers 613 form pores 617, each having an end 623, all formed from nanographene sponge 611, as shown in cross-section in FIG. 6C and in perspective view in FIG. 6D. The voids 607 between the hollow fingers 613 are then filled with polymer 619 by pouring in molten polymer such as polyethylene, polypropylene, polytetrafluorethylene, polyvinyldene fluoride, polyethersulfone, or other similar materials to form a continuous and flexible film. The deposition of polymer 619 may be flush or slightly lower than the tops of the hollow fingers 613. If a coating of polymer 619 coats the ends 623 of the pores it can be burned off with heat. The polymer sheet 619 provides mechanical stability to the structure and flexibility, as well as preventing graphene sponge protrusions from collapsing.

The resulting structure is the base structure of a dual-porosity electrode 621 made of conductive nanographene sponge 611 supported by a polymer sheet. The dual-porosity electrode 621 has two levels of porosity creating a lot of surface area for lithium or other active material and using the space inside the electrode in the most efficient way. The first level of porosity is the surface area inside the pores 617. The second level of porosity is the surface area within the micropores of the conductive nanographene sponge 611. The dual-porosity electrode 621 comprises a porous polymer matrix with pores in the micrometer range, each pore 617 is lined with nanographene sponge 611 having a thickness up to 1 micrometer. The nanographene sponge 611 layer is porous with pores from a few nm to several micrometers. The entire dual-porosity electrode 621 is flexible due to the flexible polymer 619. Flexible electrodes are very advantageous for manufacturing of flexible batteries having many applications, such as wearable devices. The dual-porosity electrode is connected to a battery circuit through one or more electrode leads.

Figure 7:
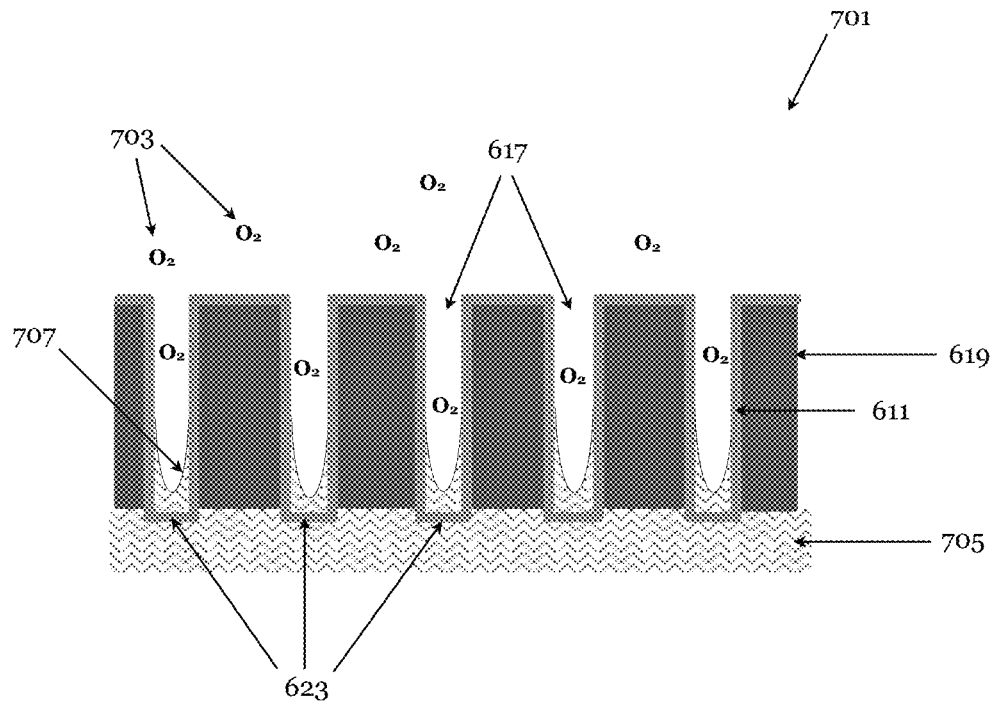
FIG. 7 shows a lithium-air cathode utilizing a dual-porosity graphene sponge electrode.

The dual-porosity electrode 621 can be used for either an anode or a cathode. When used as the basis for an anode, the micropores further discourage dendrite growth of lithium metal on the anode. The dual-porosity electrode is also useful for the cathode in a lithium-air battery. FIG. 7 depicts how the structure of dual porosity electrode can be configured to create a cathode 701 for a lithium-air battery. The open pores 617 of the cathode 701 are exposed to the oxygen 703 in the air. The ends 623 of the pores 617 of the cathode 701 are exposed to an aqueous electrolyte 705. The aqueous electrolyte 705 can be one of the known aqueous electrolytes suitable for oxygen reduction reactions such as sulfuric acid or potassium hydroxide. The graphene sponge 611 serves as the current collector; an electrode terminal in form of a conductive tab will be attached directly to nanographene sponge at a suitable location. When the porous nanographene sponge end 623 is exposed to electrolyte, some of the aqueous electrolyte 705 passes through. A meniscus 707 forms in the pores 617 at the gas-liquid interface whereby the aqueous electrolyte 705 is held by capillary forces inside the pores 617 of the cathode 701. The combination of aqueous electrolyte 705, porous graphene sponge 611, and air containing oxygen 703 creates three-phase boundary in the pores 617 of the cathode 701.

Figure 8:
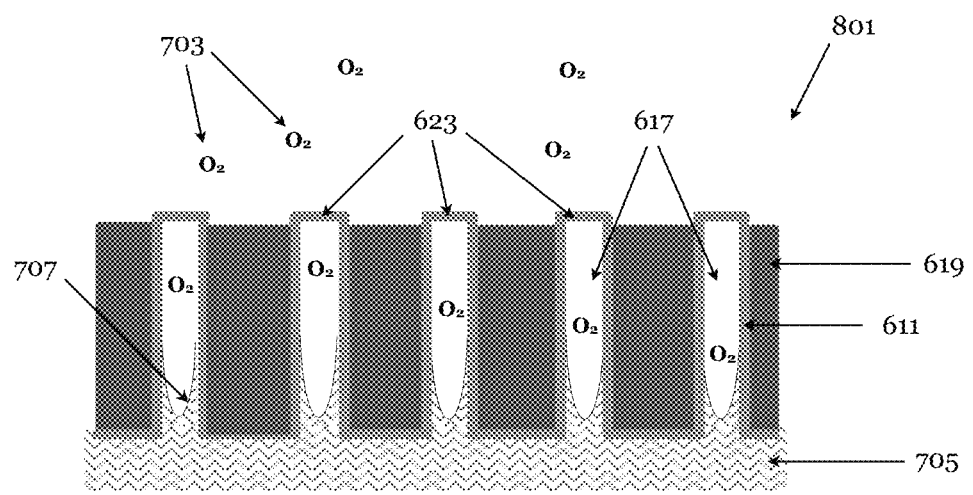
FIG. 8 shows an alternative embodiment of a lithium-air cathode utilizing a dual-porosity graphene sponge electrode.

FIG. 8 shows an alternate configuration of a lithium-air cathode 801. The open end of the pores 617 face the aqueous electrolyte 705. Oxygen 703 from the air is able to penetrate into the pores through the porous graphene sponge 611 that makes up the ends 623 to get into the pores 617. A meniscus 707 forms in the pore 617 at the air liquid interface whereby the aqueous electrolyte 705 is held by capillary forces inside each pore 617 of the cathode 801.

Figure 9:
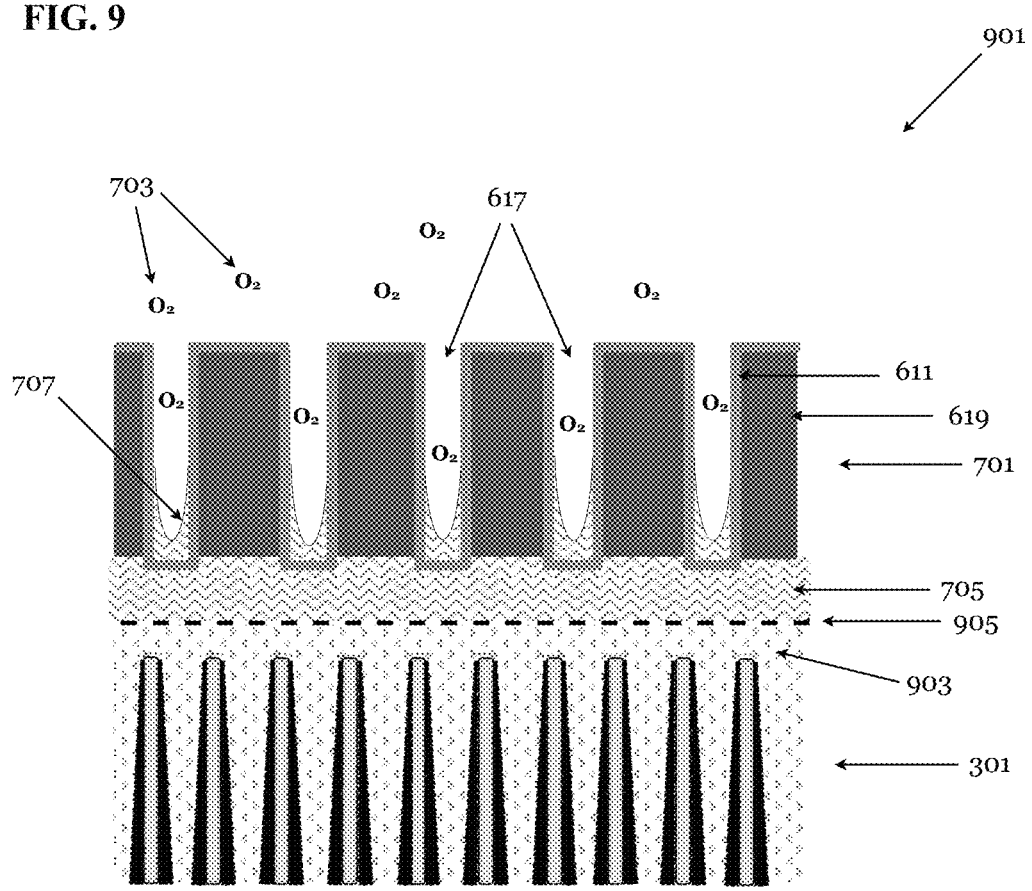
FIG. 9 shows a lithum-air battery.
Figure 10:
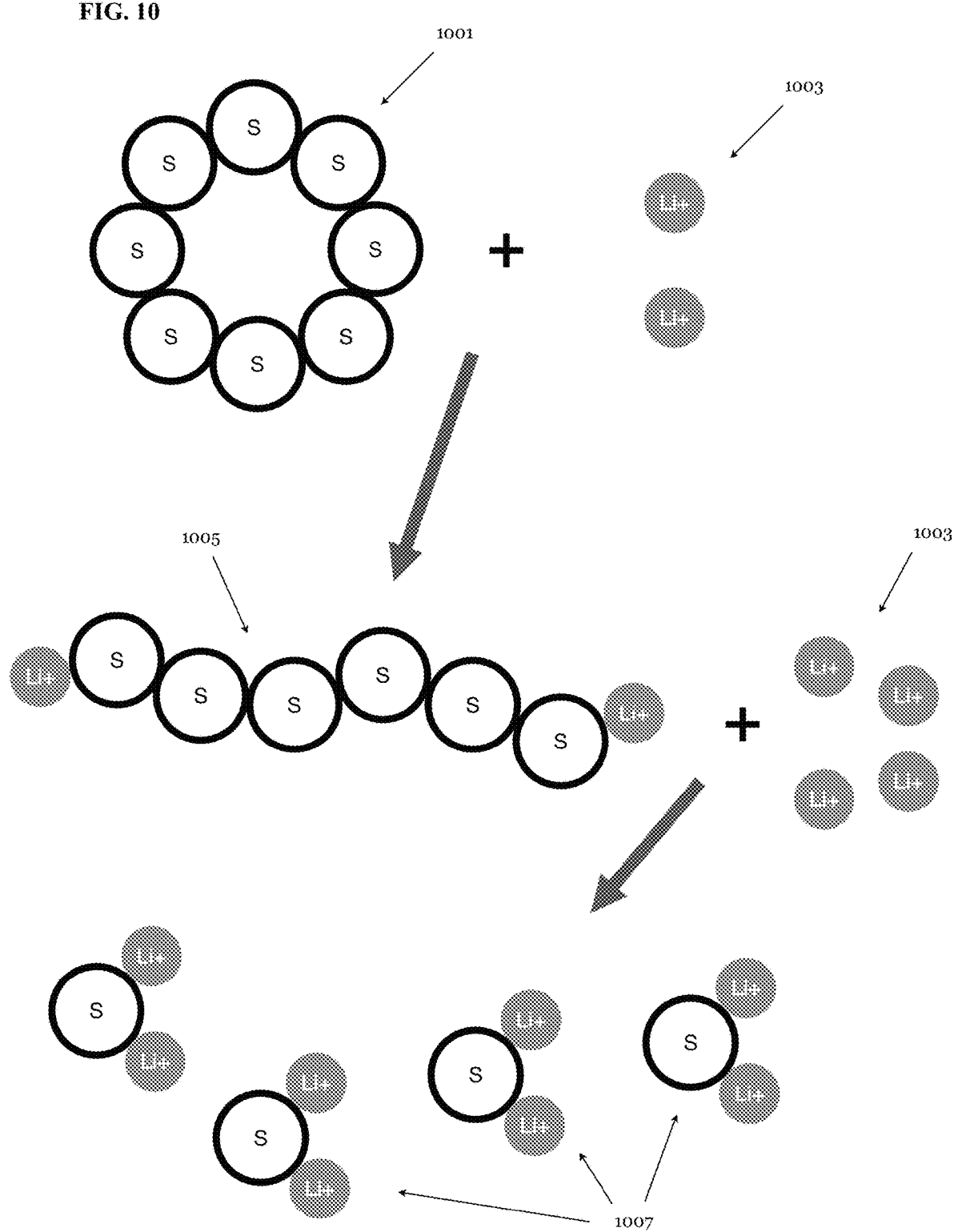
FIG. 10 shows the reactants at the cathode of a lithium-sulfur battery.

FIG. 9 shows a dual-porosity cathode 701 paired with an anode 301 to form a lithium-air battery 901. Different designs of an anode can be used with the lithium-air cathode 801. For that matter different embodiments of an anode can be paired with different embodiments of a cathode as disclosed herein to make a lithium battery. An anode described herein can also be paired with a prior art cathode to make a lithium battery. The anode 301 has an organic electrolyte 903 which is separated from the aqueous electrolyte 705 by a separator 905. Alternatively, the separation of two electrode compartments is accomplished using a solid electrolyte. Besides ensuring the interface between organic and inorganic electrolytes, the solid electrolyte also prevents lithium dendrite growth from the anode and improves the battery safety. During discharge of the battery 901, lithium metal atoms in the anode give up electrons to the circuit at the anode. The resulting lithium-ions ($Li^+$) travel through organic electrolyte 903, through the separator 905, and through the aqueous electrolyte 705 and into the pores 617 of the cathode 701 (or 801) where it reacts with oxygen 703 in air to form lithium oxide $LiO2$ in the micropores of the graphene sponge 611.

Prior attempts to make a cathode in lithium-air cells have been unsuccessful due to problems with reversibility of the cathode reaction. One of the main reasons for poor reversibility is accumulation of lithium oxide $LiO_2$ in larger masses. This problem is overcome by the dual porosity and high surface area of the cathode 701 or 801 where lithium oxide $LiO_2$ can form only in very small, localized quantities in the micropores of the porous graphene sponge 611. This problem is also overcome by the catalytic effect of the porous graphene sponge 611 that enables a more reversible reaction of lithium oxide $LiO_2$ back to lithium-ion Li+ and oxygen $O_2$ during charging.

The silicon mold 601 is easily reproduced in an inexpensive, bulk process. The protrusions 605 can also be made conical with a simple etching process along a preferential Si crystalline plane. Adjustment of the shaping of the protrusions 605 to vary from cylindrical to conical affects the characteristics of the oxygen-electrolyte meniscus inside the pores, which depends on the pore diameter and pressure differential between the atmospheric pressure of air (as a source of oxygen) and the inside pressure of a battery. It is desirable to form a long meniscus of electrolyte inside a pore, which creates long three phase boundary between the reactant oxygen (from air), liquid electrolyte and the solid conductor, graphene.

It is desirable to have the pores of the graphene sponge of the cathode only partially filled with electrolyte to enable faster diffusion of air into the pores where the reaction sites are. A pore completely filled with electrolyte would be flooded and diffusion of oxygen from air would be at a slower rate. It is desirable to make the graphene sponge slightly hydrophobic, to enable wetting of the inner surface of the pores, but not complete flooding. This can be achieved in many ways, for example by the addition of a hydrophobic agent such as Teflon. Teflon can be added during the exfoliation process and the material would be exfoliated only partially to leave some small quantities of Teflon inside. This is known to those experienced in the art of making gas diffusion electrodes. Alternatively, Teflon or other hydrophobic agents can be added in a form of suspension after the deposition of graphene sponge layer.

The mold 601 can also be made of a metal. After the deposition of porous graphene sponge 611 on the mold 601 the metal can be etched using suitable acids that dissolve the metal, but not the porous graphene sponge 611. The etchants include mixtures of hydrochloride acid, nitric acid, and sulfuric acid, among others, with addition of suitable buffers.

An alternative way of making a porous graphene sponge electrode utilizes a polymer resistant to high temperature processing, such as Paralyne F. A high temperature resistant polymer is first formed in a porous configuration such as shown in FIG. 1A. Then, the nanographene sponge (NGS) layer is deposited on the inside of the pores of the porous high temperature resistant polymer. Use of a high temperature resistant polymer such as Paralyne F also adds to the safety of the disclosed battery because Paralyne F is fire-resistant and would aid in stopping a thermal runaway reaction. This disclosure entails a lithium metal battery that has several layers of safety advantages over prior lithium metal battery designs including dendrite growth suppression inside the micropores of the graphene sponge, dendrite growth suppression inside the larger porous polymer pores, and fire-retardant properties of special polymer, Paralyne F.

Besides oxygen from air as the cathode material, sulfur and other cathode materials such as cobalt oxide, manganese oxide, nickel oxide, mixed oxides (e.g. nickel manganese cobalt oxide) and iron phosphate can also be used. When using cathode materials other than oxygen, the outside surface of the cathode is sealed from the air with a polymer or metallic layer to prevent electrolyte from leaking out of the cathode.

The porous graphene sponge cathode is also very useful for a lithium-sulfur battery where sulfur as the cathode active material. Sulfur has very high specific capacity, superior to many other cathode active materials. Sulfur atoms form a cyclic octatomic molecule with the chemical formula $S_8$ 1001. Sulfur $S_8$ 1001 is insoluble in aqueous solution. When sulfur $S_8$ 1001 initially reacts with $Li^+$ ions 1003, it forms polysulfides 1005, $Li_2S_x$ (x=6 to 8) that are soluble in organic electrolytes used in lithium batteries. The mobility of soluble lithium polysulfides allows polysulfide to drift away from the cathode resulting in a loss of capacity. But the micropores of a porous graphene sponge cathode solves this problem by confining the polysulfides 1005 in the micropores of the porous graphene sponge cathode. Because the polysulfides 1005 are kept confined by the porous graphene sponge they do not drift away the cathode until they can react with additional $Li^+$ ions 1003. As more $Li^+$ ions 1003 travel from the anode to the cathode during battery discharge, the polysulfides 1005 react to form lithium sulfide $Li_2S$ 1007 that are again insoluble and in electrical contact with the cathode. Because of micropores of the porous graphene sponge, sulfur stays confined at the cathode through repeated discharge and charge of the battery.

Another device that can be accomplished using the principle of dual porosity created using porous polymer and a layer of graphene sponge is an electrochemical supercapacitor. These devices are very popular because of the ability to deliver high power, several times higher than lithium batteries, but they don't store large amounts of energy. Typically, specific energy of electrochemical supercapacitors is 5-20 Wh/kg, compared to lithium batteries which have in the excess of 150 Wh/kg. Supercapacitors do not have any electrochemical active mass that gets converted to electricity during discharge. The charge is stored in supercapacitors electrostatically. The larger the surface area in direct contact with electrolyte, the greater the amount of electricity stored. Supercapacitors can store large amounts of energy but can deliver it only very fast and their voltage drops, consequently an electrical device cannot be powered using a supercapacitor. Modern supercapacitors are built to contain some amount of active mass similar to batteries and that part of device stores larger amounts of energy while the reaction is electrochemical of faradaic (i.e., chemical conversion of a substance generates electricity). A dual porosity electrode is useful for creating hybrid devices with a battery function combined with a supercapacitor. Graphene is extremely suitable as supercapacitor electrodes because of its high surface area and excellent conductivity. The supercapacitor portion of the hybrid device does not have any active mass, such as lithium or a cathode active mass such as iron phosphate. The supercapacitor areas on anode and cathode must face each other and have very thin layer of electrolyte between them. The battery portion of the hybrid device uses an active mass and undergo electrochemical reaction. A hybrid device constructed in such manner has both high specific energy from the stored active materials and high power, i.e., high current, from the capacitor parts of the battery.

What is claimed is:

1. A cathode comprising:
a porous nanographene sponge shell having micropores;
said porous nanographene sponge shell formed to have a planar portion with multitude of hollow fingers, each finger having an open end proximate to the planar portion, a closed end, an interior, and an exterior;
the interior of each said hollow finger forming a pore;
the exterior of each said hollow finger is embedded in a polymer layer;
said cathode having an electrode lead;
said cathode having a first level of porosity measured by the internal surface area of said pores;
said cathode having a second level of porosity measured by the internal surface area of said micropores.

2. The cathode of claim 1 further comprising:
said closed end of said fingers protrude from said polymer layer.

3. The cathode of claim 1 further comprising:
said closed end of said fingers are flush with said polymer layer.

4. The cathode of claim 1 further comprising:
said cathode formed from a silicon mold.

5. The cathode of claim 1 further comprising:
said cathode formed from a metal mold.

6. The cathode of claim 1 further comprising:
said pores are cylindrically shaped.

* * * * *